June 28, 1932. H. L. WALKER 1,864,564
OVER AND UNDER WEIGHT SCALE
Filed July 11, 1928 2 Sheets-Sheet 1

INVENTOR.
Harold L. Walker
BY
Dunn Dunn & Anderson
ATTORNEYS.

June 28, 1932.     H. L. WALKER     1,864,564
OVER AND UNDER WEIGHT SCALE
Filed July 11, 1928     2 Sheets-Sheet 2

INVENTOR.
Harold L. Walker
BY
Dunn Dunn & Anderson
ATTORNEYS.

Patented June 28, 1932

1,864,564

UNITED STATES PATENT OFFICE

HAROLD L. WALKER, OF BROOKLYN, NEW YORK, ASSIGNOR TO THE JACOBS BROS. CO., INC., OF BROOKLYN, NEW YORK, A CORPORATION OF NEW YORK

OVER AND UNDER WEIGHT SCALE

Application filed July 11, 1928. Serial No. 291,777.

This invention relates to a functionally and structurally improved scale, preferably of the evenly balanced type, and, while the features thereof may be utilized to advantage in numerous different associations, it is preferred that they be embodied in a scale of this character, and which will include a registering mechanism indicating over the under weight.

It is an object of the invention to construct a device of this character, the parts of which will be relatively few in number, and each of a simple and rugged character, these parts being capable of being assembled readily to furnish a scale operating over long periods of time with freedom from mechanical difficulty.

Among other objects of the invention are those of furnishing a scale in which friction will be reduced to a minimum; in which over and under weight will be registered accurately; in which the parts, after being assembled, may be readily adjusted and correlated by an inspector to insure accuracy of indication; and in which, furthermore, if it is necessary, after long periods of operation, to readjust the parts, this may be done readily by any man skilled in the art.

With these and further objects in mind, reference is had to the attached sheets of drawings illustrating practical embodiments of the invention, in which Figs. 1, 2, 3, and 4 are side elevation, transverse, perspective, and sectional views, respectively, of one form of scale mechanism which may be employed.

Figure 1:
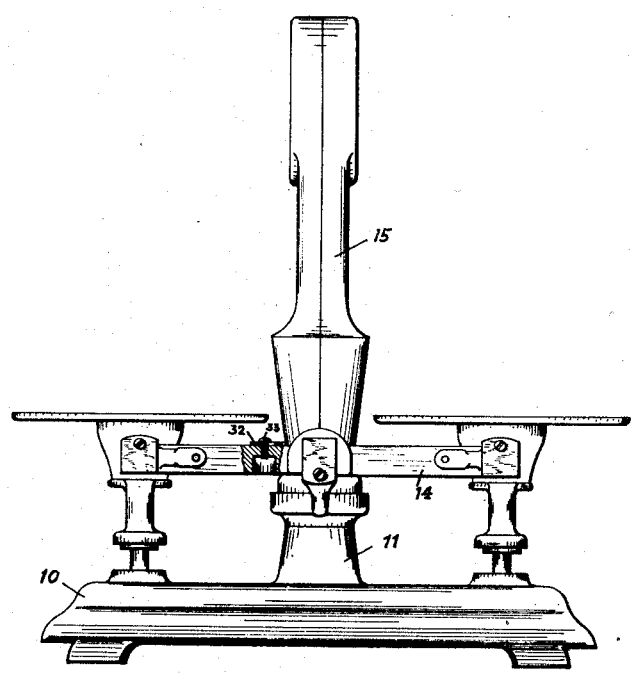
Figure 2:
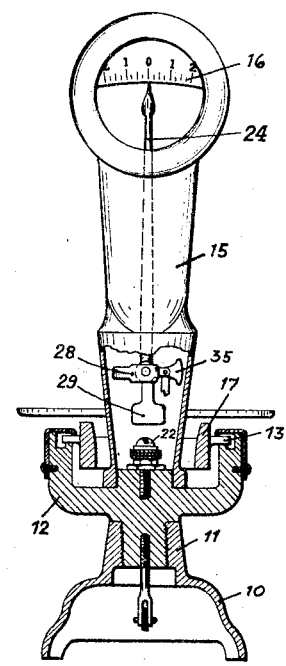
Figure 3:
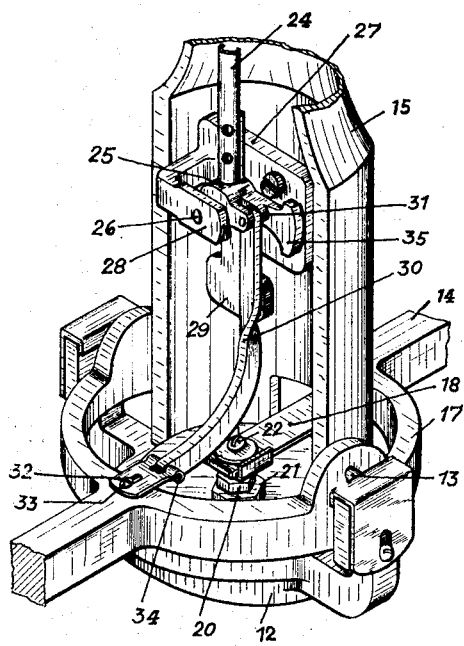
Figure 4:
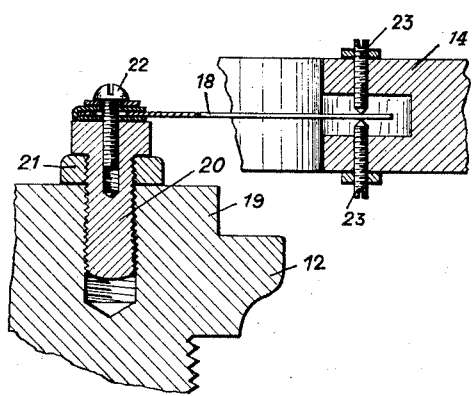

With primary reference to Figs. 1, 2 and 3, it will be observed that the numeral 10 indicates a scale base of any desired type, from which, in the embodiment illustrated, a pedestal portion 11 extends centrally, this portion supporting a yoke 12, the arms of which carry, as, for example, by knife-edge pivot members 13, a scale beam 14.

As shown, the pedestal may support a housing in the form of a column or tower 15, terminating in a face portion within which a dial 16 is visible. In the views in question, this registering mechanism is disposed transversely of the movements of the beam, thus furnishing what is commonly known as a "cross tower" scale. It will, however, be hereinafter apparent that the registering mechanism might move in a plane, for example, parallel to the movements of the beam, without in any manner departing from the spirit of the invention.

Due to the fact that in the illustrated embodiments of the invention, the tower or housing 15 has been shown centrally disposed, the beam 14 is provided with a collar portion 17 encircling this housing and disposed intermediate thereof. In order to maintain the beam in neutral or evenly balanced position, it is preferred that a flexion strip 18 be utilized, which has one of its ends secured to an extension of the pedestal 11, as, for example, by prolonging the central portion 19 of the yoke 12 and mounting upon the upper face of this portion a bolt 20, which is normally held against movement by a lock-nut 21, and has its head bored and tapped to receive a set-screw 22.

This screw passes through a slot formed in the inner end of the strip or other resilient member 18, and as a consequence, while the bolt may be adjusted to correspondingly adjust the plane of the resilient element, the effective length of the latter may likewise be varied by shifting the same after loosening the set-screw, which is subsequently tightened when the proper position of the strip has been established. The outer end of the strip may be engaged by two adjustable pins 23, which are mounted by the beam 14 and are opposed to each other to engage the opposite faces of the strip, it being here noted that the ends of the pins are preferably reduced to reduce or eliminate friction as far as is practicable to do so. It will thus be apparent that the parts may be adjusted with that degree of nicety, insuring a nicety of operation and a constant tendency of the beam to assume a neutral position, which position of the beam will be indicated accurately at all times by the registering mechanism, of which the dial 16 forms a part.

Registering with the dial is a pointer 24, and, in the embodiment illustrated, it is this portion of the registering mechanism which moves. To this end, the pointer is mounted upon a supporting element 25, having a shaft 26, the ends of which bear, one in the base 27 of a bracket, and the other having bearing in the arm 28 of this element. In order to equalize or counter-balance the weight of the pointer, the supporting element 25 is preferably extended, as at 29, to provide a counter-balance and with a view to connecting the beam to the pointer a link is employed which may have its body twisted, as at 30, the upper end therof being connected to the supporting member, as, for example, by being arranged between and secured to a pair of spaced lugs 31, which form an integral part of this element.

The lower end of the link is pivotally secured to the beam, and this connection may be established by utilizing a strip of sheet metal 32, which is formed with a slot through which a set-screw 33 passes into the beam body, so that the position of the strip may be adjusted. The inner end of this element may be coiled around a pin, as at 34, which latter is supported by and extends from the lower end of the link.

It will be obvious that by means of this construction it will be practicable to readily adjust the several parts so that (a) the beam will always tend to be in its neutral position, (b) the amount of resistance offered by deflection to either side of this position will be equal, (c) the pointer will accurately register the position of the beam, and (d) if, at any time, it becomes necessary to adjust the parts, this may readily be done. At this time it will also be observed that the supporting member 25 is preferably formed with an extension 35, which acts as a compensating weight, tending at all times to thrust downwardly on the link, thus taking up all slack at the pivot points and preventing lost motion. Also, considering the attachment between the lower end of the link and the beam, it will be observed that by having the strip 32 of sheet metal the body of the strip may be bent to provide for adjustment, this being in addition to the fact that the strip may be shifted by loosening the screw 33.

Figure 5:
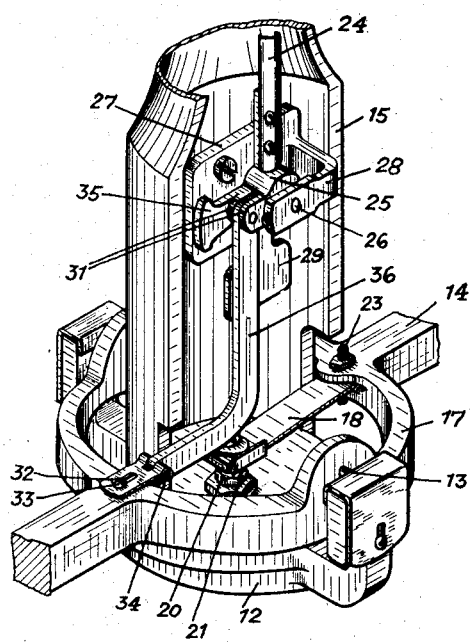
Fig. 5 is a view similar to Fig. 3, but showing a slightly different rearrangement of the mechanism.
Figure 6:
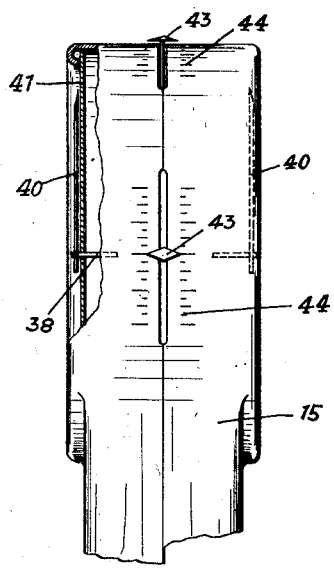
Figs. 6 and 7 are body fragmentary front and side views of a registering mechanism which may be employed in lieu of that illustrated in the previous figures.

It will be observed that in Fig. 5 the same structure as illustrated in connection with Fig. 3 has been shown, but that the link 36 in this instance is not provided with a right angle bend. As a consequence, it is practicable to employ a registering mechanism which, as aforestated, has its movements in a plane substantially parallel to its beam movements, it being noted, as in connection with the previously described structure, the magnitude of the movement of the registering mechanism will be far greater than would be the case were the pointer directly attached to the scale beam.

Figure 7:
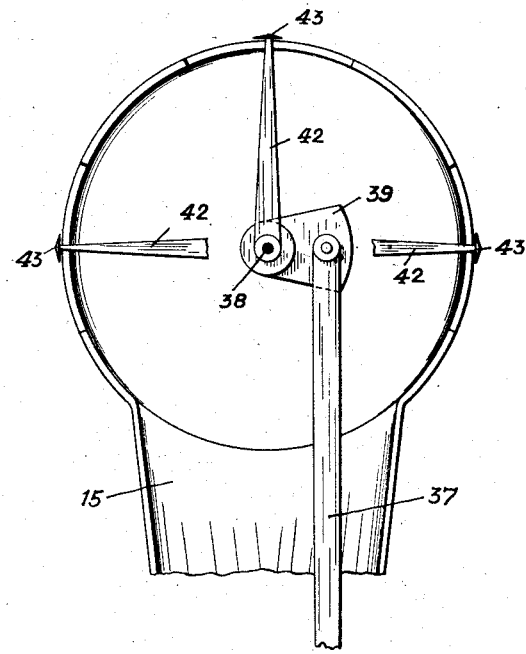

It is obvious that instead of terminating the link 36 at a point adjacent the lower end of the housing 15, this link might be extended, as at 37, in Fig. 7, to the upper end of the housing, at which point it is connected to a shaft 38 carrying the compensating weight 39. This shaft, as shown, serves to operate a series of registering mechanisms by carrying at each of its ends pointers 40, traversing dials 41, or by supporting a radial series of arms 42 terminating in pointers 43 extending through slots in the head of the housing and registering with series of graduations 44. Thus, as the beam moves any or all of the registering mechanisms provided will serve to indicate the degree or amount of over and under weight which exists, it being apparent that if the link, at 37, has in its lower end a right angle twist, that the scale of the "cross tower" type may be provided, while if the link has no bend of this nature, the registering mechanisms will all move in planes parallel to the direction of beam movement.

Figure 8:
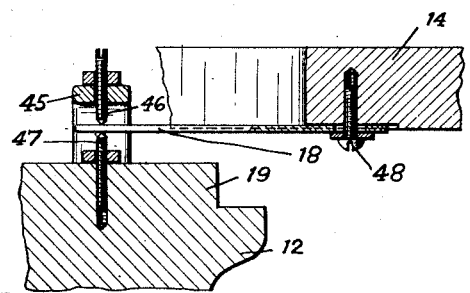
Figs. 8 and 9 are views similar to Fig. 4, but showing a different form of mechanism from that shown in the preceding figure, for establishing the neutral position of the beam.
Figure 9:
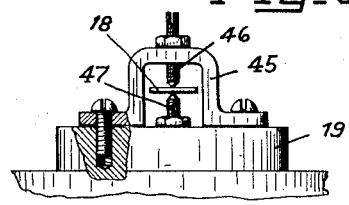

Finally, in certain instances it has been found desirable to anchor the end of the flexion strip to the beam and to have the pedestal portion or extension thereof slidingly engage the end of the strip. Where it is desired to utilize a structure such as this, the arrangement shown in Figs. 8 and 9 may be employed, in which the pedestal portion 19 carries a bracket 45, mounting a pin 46, which engages the upper face of the strip 18, the lower face of this strip being engaged by a pin 47 associated with the pedestal portion. The inner end of the strip is clamped to the beam, as by a set-screw 48, which passes through a slot in the strip to permit of adjustment.

From the foregoing, it will be appreciated that the several objects and advantages above enumerated are achieved. It is intended, however, that numerous changes in construction an rearrangement of the parts might be resorted to without in the slightest degree departing from the spirit of the invention or the scope of the claims.

Having described my invention, what I claim as new and desire to secure by Letters Patent is:

1. A scale including a base, a beam rockingly mounted thereon, a flexion strip, means for normally retaining one end of said flexion strip against movement with respect to said beam and means slidably engaging the opposite end of said strip to retain the same in predetermined position with reference to said base.

2. A scale including a base, a beam rockingly mounted thereon, a resilient strip having one of its ends secured to said beam and normally held against movement with respect thereto and means carried by said base and frictionally engaging the opposite faces of said strip to normally tend to retain the beam in predetermined position.

3. A scale including a base, a beam rockingly mounted thereon, a substantially horizontally extending flexion strip, means for clamping the outer end of said strip to said beam and means extending from said base and engaging the opposite faces of said strip to maintain the beam in predetermined position.

4. A scale including a base, a beam rockingly mounted thereon, a substantially horizontally extending flexion strip, means for clamping the outer end of said strip to said beam and a pair of pins carried by said base and slidably engaging the upper and lower faces of said strip whereby said beam will tend to maintain an even-balance condition.

5. A scale including a base, a beam rockingly mounted thereby, a link having one of its ends connected to said beam, a registering mechanism including a rockingly mounted supporting member movable in a plane at an angle to the plane of rocking of said beam, means for connecting the opposite end of said link to said mounting member and the body of said link being twisted.

6. A scale including a base, a beam rockingly supported thereon, a registering mechanism including a rockingly mounted supporting member, a link having one of its ends connected to said mounting member to move the same and a member slidably connected to said beam secured to the opposite end of said link for adjustably supporting the same and resilient means forming a part of said scale and cooperating with said beam to normally maintain the latter in an even-balanced condition, the registering mechanism indicating any deflection and the weight-value of such deflection by said beam from said condition.

7. A scale including a base, a beam rockingly supported thereon, a registering mechanism including a rockingly mounted supporting member, a link having one of its ends connected to said mounting member to move the same and a member formed of bendable material and secured to said beam and to the opposite end of said link for connecting the latter to said beam.

8. A scale including a base, a beam rockingly supported thereon, a registering mechanism including a rockingly mounted supporting member, a link having one of its ends connected to said mounting member to move the same and a member formed of sheet metal secured to said beam and connected to the opposite end of said link for imparting movement to the latter.

9. A scale including a base, a beam rockingly mounted thereby, a resilient element connected to said beam for normally maintaining the same in an even-balance condition, a registering mechanism, means connecting said mechanism to said beam and means including a weight forming a part of said mechanism and acting to compensate for play between the several parts associated therewith and prevent error of registration.

10. A scale including a base, a beam rockingly mounted thereon, a flexion strip for normally maintaining the neutral position of said beam, a registering mechanism including a rockingly mounted supporting member, a weight forming a part of said member and acting to normally thrust the same in one direction and means connecting said beam to said supporting member.

11. A scale including a base, a beam rockingly mounted thereon, a flexion strip for normally maintaining the neutral position of said beam, a registering mechanism including a rockingly mounted supporting member, a weight forming a part of said member and acting to normally thrust the same in one direction, means connecting said beam to said supporting member and a counterweight associated with said supporting member to balance the weight of a portion of said registering mechanism.

12. A scale including a rockingly mounted beam, a slotted housing extending adjacent said beam, means for normally maintaining said beam in predetermined position, means connected to said beam and extending within said housing for actuating a registering mechanism and a registering mechanism including a pointer extending through the slot in said housing and connected to said last named means and said housing being formed with a series of graduations to be traversed by said pointer.

13. A scale including a rockingly mounted beam, a housing extending adjacent said beam, means for normally maintaining said beam in predetermined position, means connected to said beam and extending within said housing for actuating a registering mechanism and said registering mechanism including a shaft, a supporting member associated with said shaft and connected to said last named means to be moved thereby, dials associated with the opposite faces of said housing, pointers secured to said shaft and to traverse said dials and further pointers also secured to said shaft and extending through slots in said casing.

14. A scale including a base, a beam rockingly mounted thereby, a registering mechanism including a pointer and dial relatively movable to indicate deflections of said beam to either side of a horizontal position, a crank forming a part of said mechanism, means for rockingly mounting said crank, a link connected to said crank and beam whereby to transmit movements to the former, and resilient means normally maintaining said beam against deflection and disposed and connected to said beam and base respectively adjacent the point of rocking mounting of the former upon the latter.

In testimony whereof I affix my signature.

HAROLD L. WALKER.